April 23, 1957   E. UMBRICHT   2,789,866
TOP-SUPPORTED ROTATABLE SPRAY-GENERATING CAGE WITH ORIFICE FEED
Filed Dec. 23, 1953
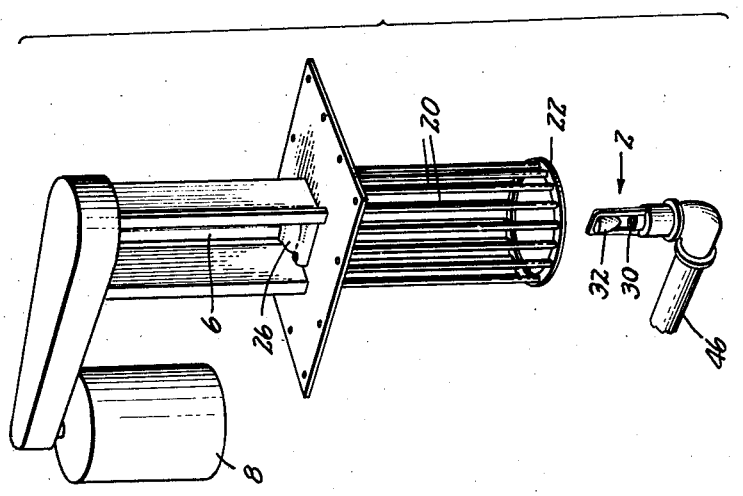
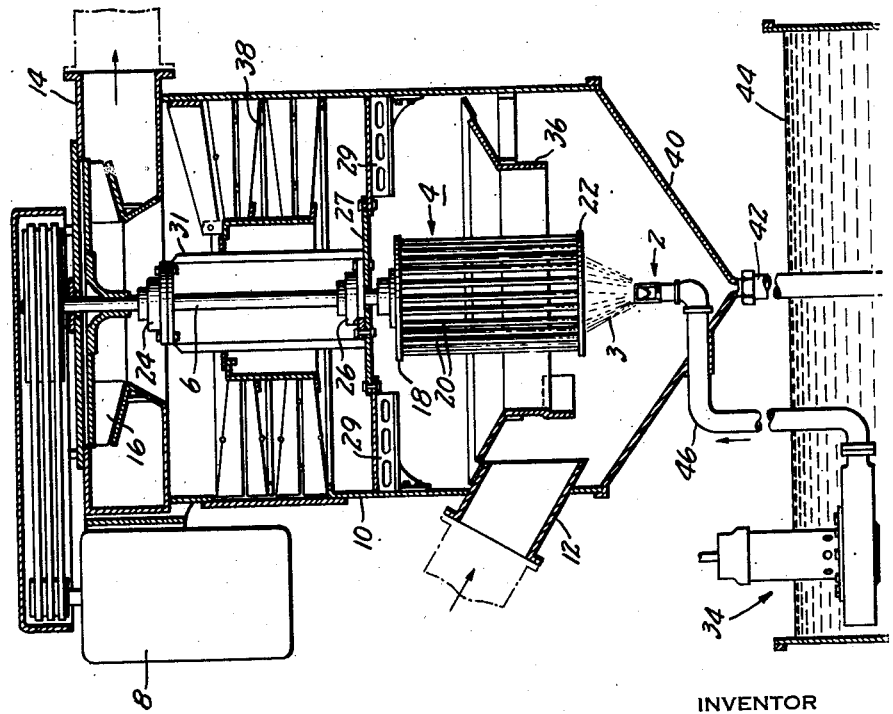
INVENTOR
EMIL UMBRICHT
BY
Curtis, Morris & Safford.
ATTORNEYS

United States Patent Office 2,789,866
Patented Apr. 23, 1957

2,789,866

TOP-SUPPORTED ROTATABLE SPRAY-GENERATING CAGE WITH ORIFICE FEED

Emil Umbricht, Jackson, Mich., assignor to Ajem Laboratories, Inc., Livonia, Mich., a corporation of Michigan Application December 23, 1953, Serial No. 399,971

9 Claims. (Cl. 299—62)

This invention relates to spray-generating equipment and more particularly to spray-generating equipment for generating a high-volume, high-velocity spray such as is used in particle collection apparatus, aeration equipment, or gas-liquid absorption or reaction processes.

Air-washers of this general type have been in use for a substantial period of time and one such washer is described in U. S. Patent No. 2,599,202, issued June 3, 1952. In such apparatus a rotating cage is formed of spaced vertically-extending impeller members and water or other liquid is pumped from beneath the cage up into the interior of the cage where the impeller members throw the liquid, outwardly into a radial spray. The present invention represents an improvement in apparatus of this type.

In apparatus of the type described in the above-identified patent, it is necessary to provide a mechanical connection between the cage and the impeller or pump which is positioned beneath the cage to throw water from the reservoir up into the interior of the spray-generating cage. This usually is done by means of the drive shaft which rotates the cage, this shaft extending downwardly through the interior of the cage and carrying near its lower end the impeller blades which are positioned below the level of the liquid in the reservoir. It is also necessary to provide a bearing to support the lower end of the shaft and this bearing ordinarily is positioned below the level of the liquid in the reservoir.

In a preferred embodiment of the present invention, the spray-generating cage is supported entirely from above and no support is provided for the lower portion of the cage. This interior of the cage is entirely free of mechanical structure and the liquid is supplied by means of an orifice positioned below the cage to which the liquid is supplied under pressure. This arrangement results in a number of advantages. One obvious advantage is the elimination of mechanical structure within the cage which permits better distribution of the liquid throughout the height of the cage. In such apparatus, it is frequently desirable that the spray be more dense, or formed of larger droplets near the upper portion of the spray, and such non-uniform distribution is more readily obtained and controlled when the interior of the cage is free from obstructions and an orifice is used to throw the liquid to the interior of the spray-generating cage. It will be apparent that the shape and size of the spray delivered by the orifice can be readily adjusted and the orifice can be easily moved up and down to provide the most advantageous spray.

In apparatus, such as is described in the above-identified patent, the liquid which is in the washing or reaction process is retained in the reservoir immediately beneath the spray-generating cage and the impeller blades are positioned in this reservoir to throw the water up into the cage. In such an arrangement only a limited amount of liquid can be used in the process and this liquid is re-circulated without separating the particles from the liquid. Thus, the liquid which is thrown into the cage to generate the spray is already partially contaminated with particles that have been collected and is somewhat less efficient than if clean water or other liquid is supplied to the cage at all times. With the present arrangement, a remote reservoir may be used and which can be made sufficiently large that it can operate as an adequate settling tank so that the collected particles can be removed from the liquid before it is re-circulated.

Thus the spray which is collected inside the washing unit is returned directly to the remote reservoir where the solid particles are separated from the liquid, by settling or other means, and the clean liquid resulting from this separation is then pumped back to the orifice and again fed into the spray-generating cage. In addition, such an arrangement provides increased flexibility when the apparatus is being used in connection with chemical processes involving gas-liquid absorption or reaction. For example, the rate of supply of the liquid to the spray-generating cage is readily controlled and is independent of the speed with which the spray-generating cage is driven. Moreover, it is apparent that the exposed liquid need not be re-circulated but may be collected in a separate reservoir or container after a single exposure to the gas.

The foregoing and other objects and advantages of the present invention will be apparent from consideration of the following description of a preferred embodiment of the invention, considered together with the accompanying drawings, in which:

Figure 1 is a vertical sectional view through an air-washing unit embodying the present invention; and Figure 2 is an enlarged partial perspective view showing the arrangement of the spray-generating cage and the nozzle assembly for providing liquid to the cage.

As shown in Figure 1, the air-washing unit includes a nozzle assembly, generally indicated at 2, which produces an upward conical spray of water 3 into the open interior of a spray-generating cage 4 which is rotated rapidly by means of a vertical drive-shaft 6 that is driven by an electric motor 8.

The spray-generating apparatus is positioned within a cylindrical container 10 which is provided with an inlet 12 through which the air enters the chamber 10, passes upwardly through the spray produced by the spray-generating cage, and out through an outlet 14. A fan or blower 16 is driven by the motor 8 and forces the air which is to be washed through the apparatus.

Figure 2 shows more clearly the construction of the nozzle-assembly 2 and the spray-generating cage 4. The cage 4 includes an upper disc 18 which supports around its periphery a number of spaced downwardly extending rods 20. These rods are secured together at their lower ends by an annular ring 22. The disc 18 is supported at its center by the drive-shaft 6, which is secured by suitable means such as bolts, rivets or welding to the upper surface of the disc 18. The drive-shaft 6 is in turn supported by upper and lower bearings 24 and 26 which may be of conventional construction. Because of the cantilever support of the cage 4, it is desirable that the bearings 24 and 26 be spaced a substantial distance apart along the drive-shaft 6. It is preferred that the spacing between these bearings be at least equal to the vertical height of the cage 4, in order to provide a sufficiently rigid support for the spray-generating cage.

The lower bearing 26 is supported by a plate 27 which is secured in position by a number of braces 29 which form a supporting spider. The upper bearing 24 is supported by a similar arrangement of braces which are not shown in the drawings in order to simplify the illustration.

The nozzle-assembly 2 which is positioned beneath the cage 4 may be of any desired construction but must be capable of supplying sufficient water to the cage 4 and must distribute this water throughout the length of the cage 4. The nozzle-assembly 2, illustrated in the drawing, is well-adapted for this purpose. This nozzle-assembly is connected to a supply pipe 46 which communicates with an orifice 30 (Figure 2) of reduced internal diameter. A bullet-shaped director 32 is positioned directly in front of the orifice 30 and is so shaped as to cause the water to expand into a conical spray and which does not cause the water to break into a fine mist. Thus the distribution of an adequate supply of water is provided throughout the interior of the cage 4. The particular nozzle-assembly illustrated in the drawing, and other suitable modifications thereof, are described more fully in my co-pending application Serial No. 334,420, filed February 2, 1953 (Attorney's Docket No. 122008).

In operation, the water or other liquid is supplied under suitable pressure by means of a pump 34 to the nozzle-assembly 2. The water emerges from the orifice 30 and passes over the director 32 which produces a conical spray and which, beyond a predetermined distance from the director 32, distributes the water substantially uniformly over each transverse cross-section of the cone. This water spray is so arranged that at lower end of the gate the cross-section of the conical spray is substantially the same diameter as that of the cage 4. The spray-generating cage is rotated rapidly by the motor 8 so that the water which impinges upon the rods 20 is thrown outwardly forming a high-velocity spray of substantially uniform distribution over the cross-sectional area of the container 10.

The air from which the particles are to be removed enters the container 10 through the inlet 12 and is distributed around the circumference of the container 10 by means of an annular baffle 36. The air passes upwardly through the dense spray of water and then through a set of water-eliminators or baffles 38 within which the air is forced to change direction of flow rapidly several times in order to eliminate any particles which may be carried upwardly in the draft of air and then is forced outwardly by the fan or blower 16 through the outlet 14.

The spray generated by the cage 4 strikes the walls of the container and is collected in the conical bottom portion 40 of the container 10 and flows out through a drain-pipe 42 that opens into a remotely-positioned settling tank, indicated diagrammatically at 44. In this settling tank the particles which are collected by the spray are separated from the liquid. This may be accomplished, for example, by allowing the particles to settle and then removing the concentrated sludge with the usual mechanical apparatus. Other particle-removing devices such as the centrifuges of the like, may be employed if desired.

A pump 34 positioned below the level of the liquid (advantageously of the type disclosed and claimed in my copending application Serial No. 357,450, filed May 26, 1953) forces the liquid from which the collected particles have been removed, through the pipe 46 and the orifice 30 into the spray generating cage 4.

It will be apparent that it is not necessary in the present system to re-circulate the liquid, but that re-circulation can be accomplished economically and that when this is done clean water is always provided for the spray. Moreover, a number of washing units may be connected to a single reservoir or settling tank, thus further reducing the cost and reducing the space required for the installation of each air-washing unit.

Apparatus similar to that illustrated by Figures 1 and 2 may be used also in connection with chemical reaction or absorption processes. For example, such apparatus may be used in oxidation reactions in which clean air is passed through the spray which is formed by the liquid that is to be oxidized.

The apparatus may be used also to carry out gas-liquid absorption or chemical reaction processes in which the liquid may be passed only once through the spray and in which the liquid is re-circulated a given number of times.

The diameter of the spray-generating cage 4 will depend upon the particular application and the capacity of the unit. Ordinarily this diameter is between five and twenty-four inches. The rods 20 accordingly will vary in size and usually are between one-quarter and one inch in diameter. The rods, illustrated in the drawings, are circular in cross-section but if desired may be formed in square, oval, hexagonal or elliptical shape. Moreover, in order to obtain a desired distribution of the spray between the upper and lower portions of the cage 4, the rods may be tapered. For example, tapered rods may be used having a larger diameter at the top and thus help to establish a heavier dispersed spray near the top of the cage which will prevent the spray being carried upwardly with the air-draft and yet maintain a more efficient particle-collection action. The rods may be spaced any desired distance apart around the periphery of the cage 4, depending upon the characteristics of the spray which are desired, and ordinarily will be spaced a distance equal to between one-half and three times the diameter of the individual rods.

The surface angle of the director unit 32 should be such as to provide a smooth flow of the deflected water without breaking it up into a fine spray or mist. Ordinarily the angle between the tangents of the surface of the conical portion of bullet shaped director should be between thirty and sixty degrees. The exact angle to be used depends upon the length of the cage and its diameter and also upon the relative position between the orifice and the cage. The angle should be adjusted to get the desired water distribution along the interior of the cage 4. If desired, the director 32 may be adjustably supported so that its position relative to the orifice 30 can be varied and thereby provide a ready adjustment of the distribution of liquid within the cage 4.

The surface of the director 32 may be fluted if desired and these flutes may be arranged in spiral manner to give a slight rotary motion to the water as it enters the cage 4. Auxiliary vanes may be used to provide a slight rotary motion to the spray as it enters the cage 4.

From the foregoing, it will be apparent that the embodiment of the invention illustrated above is well-adapted to carry out the ends and objects hereinbefore set forth and that it can be readily manufactured by conventional techniques and that it may be modified in a variety of ways in order to best fit it for each particular use.

I claim:

1. Spray-producing apparatus comprising a substantially cylindrical cage formed of spaced parallel rods, drive means for rotating said cage about a vertical axis, the interior of said cage defined by said rods being open and free of obstructions, means supplying liquid under pressure, and an orifice connected to said supply means and positioned beneath said cage and arranged to direct selectively a stream of relatively heavy particles of liquid upwardly and outwardly into the interior of said cage and against said rods.

2. Spray-producing apparatus comprising a substantially cylindrical cage formed of spaced vertically-extending rods, a vertical shaft supporting said cage and terminating at the upper end thereof, drive means for rotating said shaft and said cage about a vertical axis, the interior of said cage defined by said rods being open and free of obstructions, means supplying liquid under pressure, and an orifice connected to said supply means and positioned beneath said cage and arranged to direct a stream of relatively heavy particles of liquid up into the interior of said cage.

3. Spray-producing apparatus comprising a substantially cylindrical cage formed of spaced vertically-extending rods, drive means for rotating said cage about a vertical axis, the interior of said cage defined by said rods being open and free of obstructions, means supplying liquid under pressure, and a nozzle-assembly having an orifice connected to said supply means and positioned beneath and directed toward said cage and a bullet-shaped director positioned in front of said orifice and arranged to direct a conical spray of relatively heavy particles of liquid upwardly and outwardly into the interior of said cage, the diameter of said spray at the bottom of said cage being substantially equal or less than to the diameter of said cage.

4. Spray-producing apparatus comprising a substantially cylindrical cage formed of spaced vertically-extending rods, drive means for rotating said cage about a vertical axis, the interior of said cage defined by said rods being open and free of obstructions, a reservoir arranged to receive liquid from the spray produced by said cage, a pump communicating with said reservoir, and a nozzle-assembly having an orifice connected to said pump and positioned beneath said cage and arranged to direct a substantially conical stream of relatively heavy particles of liquid up into the interior of said cage.

5. Particle-collection apparatus comprising a substantially cylindrical cage formed of spaced vertically-extending rods, a drive shaft connected to and terminating at the upper part of said cage for rotating said cage about a vertical axis, a remotely-positioned reservoir, means for collecting liquid from the spray produced by said cage and conducting it to said reservoir, particle-separation means associated with said reservoir, a re-circulating pump communicating with said reservoir, and a nozzle-assembly having a jet-forming orifice connected to said supply means and positioned beneath said cage and arranged to direct a substantially conical spray of relatively heavy particles of liquid up into the interior of said cage.

6. Spray-producing apparatus comprising a substantially cylindrical cage formed of spaced vertically-extending tapered rods, said rods having a larger diameter at their top, drive means for rotating said cage about a vertical axis, the interior of said cage defined by said rods being free of obstructions, means supplying liquid under pressure, and a nozzle-assembly having an orifice connected to said supply means and positioned beneath and directed toward said cage and a bullet-shaped director positioned in front of said orifice and arranged to direct a conical spray of relatively heavy particles of liquild up into the interior of said cage, the diameter of said spray at the bottom of said cage being substantially equal to or less than the diameter of said cage.

7. Spray-producing apparatus comprising a substantially cylindrical cage formed of spaced vertically-extending rods, each rod being spaced from its adjacent members one-half to three times the average diameter of all the rods, drive means for rotating said cage about a vertical axis, the interior of said cage defined by said rods being open and free of obstructions, means supplying liquid under pressure, and a nozzle assembly having an orifice connected to said supply means and positioned beneath and directed towards said cage and a bullet-shaped director positioned in front of said orifice and arranged to direct a conical spray of relatively heavy particles of liquid up into the interior of said cage, the diameter of said spray at the bottom of said cage being substantially equal to or less than the diameter of said cage.

8. Spray-producing apparatus comprising a substantially cylindrical cage formed of spaced vertically-extending rods, drive means for rotating said cage about a vertical axis, the interior of said cage defined by said rods being free and open and free of obstructions, means supplying liquid under pressure, and a nozzle-assembly having an orifice connected to said supply means and positioned beneath and directed towards said cage and a bullet-shaped director adjustably positioned in front of said orifice and arranged to direct a conical spray of relatively heavy particles of liquid up into the interior of said cage, the diameter of said spray at the bottom of said cage being substantially equal to or less than the diameter of said cage.

9. Spray-producing apparatus comprising a substantially cylindrical cage formed of spaced parallel rods, drive means for rotating said cage about a vertical axis, the interior of said cage defined by said rods being open and free of obstruction, said rods being tapered and having a larger diameter at the top of said cage, a reservoir arranged to receive liquid from the spray produced by said cage, means supplying liquid under pressure including a pump communicating with said reservoir, and an orifice connected to said supply means and positioned beneath said cage and arranged to direct a stream of liquid up into the interior of said cage and against said tapered rods.

References Cited in the file of this patent
UNITED STATES PATENTS

| 923,856 | Kestner | June 8, 1909 |
| 1,894,864 | Hall | Jan. 17, 1933 |
| 2,599,202 | Schimpke | June 3, 1952 |

FOREIGN PATENTS

| 14,873 | Germany | of 1881 |